(12) United States Patent
Schnitzler et al.

(10) Patent No.: US 7,133,198 B2
(45) Date of Patent: Nov. 7, 2006

(54) CHANGER DEVICE FOR OPTICAL ELEMENTS

(75) Inventors: Harald Schnitzler, Lüchingen (CH); Heinz Zimmermann, Balgach (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 5 days.

(21) Appl. No.: 10/998,463

(22) Filed: Nov. 29, 2004

(65) Prior Publication Data

US 2005/0117208 A1    Jun. 2, 2005

(30) Foreign Application Priority Data

Dec. 2, 2003 (DE) ................. 103 56 154

(51) Int. Cl.
  *G02B 21/06*   (2006.01)
  *G02B 21/22*   (2006.01)
(52) U.S. Cl. ................. 359/381; 359/377
(58) Field of Classification Search ........... 359/381, 359/321, 384
  See application file for complete search history.

(56) References Cited

U.S. PATENT DOCUMENTS

| 5,706,128 A * | 1/1998 | Greenberg .................. 359/385 |
| 5,764,408 A | 6/1998 | Otaki |
| 5,865,829 A | 2/1999 | Kitajima |
| 6,088,155 A | 7/2000 | Tandler et al. |
| 6,219,182 B1 * | 4/2001 | McKinley .................. 359/407 |
| 6,313,960 B1 * | 11/2001 | Marquiss et al. ........... 359/892 |
| 6,563,113 B1 | 5/2003 | Amann et al. |
| 2005/0141071 A1 | 6/2005 | Huettel et al. |
| 2005/0231799 A1 * | 10/2005 | Kawasaki et al. .......... 359/385 |

FOREIGN PATENT DOCUMENTS

DE    4404286 A1    8/1995

* cited by examiner

*Primary Examiner*—Mark A. Robinson
*Assistant Examiner*—Scott Stephens
(74) *Attorney, Agent, or Firm*—Hodgson Russ LLP

(57) ABSTRACT

The invention proposes a changer device for optical elements (2a–2e) in stereomicroscopes with which a pair of optical elements (2) can be inserted in the two stereo channels (3) of a stereomicroscope. A particularly compact construction can be achieved by arranging the optical elements (2) side by side in an arc, more particularly in a circle, while between the elements of a pair of elements (2a, 2d) associated with the two stereo channels (3), at least one other optical element (2e; 2b, 2c) is provided, and in that the center (4) of the arcuate or circular arrangement (1) is shifted laterally away from the middle (5) of the stereobase of the stereo channels (3).

16 Claims, 2 Drawing Sheets

CHANGER DEVICE FOR OPTICAL ELEMENTS

CROSS-REFERENCE TO RELATED APPLICATION

Figure 1A:
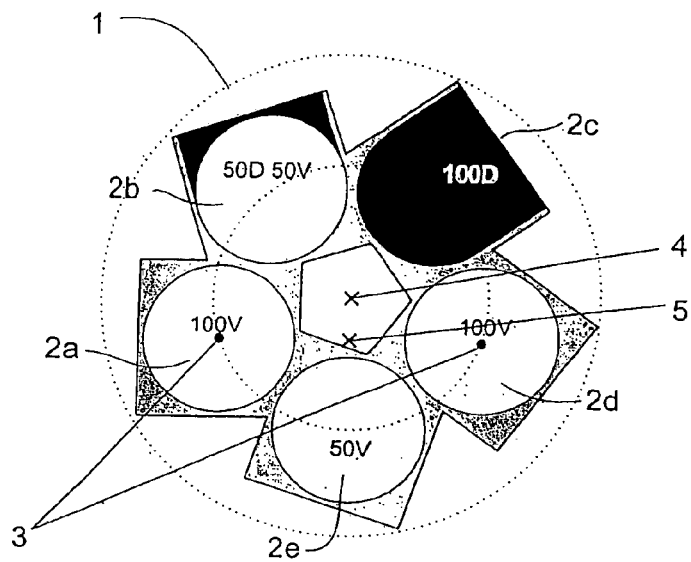

The present application claims priority of German patent application no. 103 56 154.4 filed Dec. 2, 2003.

FIELD OF THE INVENTION

The invention relates to a changer device for optical elements in stereomicroscopes with which a pair of optical elements can be placed in the two stereo channels of a stereomicroscope.

BACKGROUND OF THE INVENTION

Changer devices of this kind are frequently used to achieve different operating positions in a stereomicroscope, for example to connect, couple, and/or decouple, or deflect partially or wholly one of the two optical paths for documentation, for superimposing or for measurement, regulation or monitoring purposes. In addition, suitable shutters and/or filters can be placed in one or both optical paths.

DE 196 22 357 A1 discloses a changer device of this kind for switching the operating modes of a microscope tube between the positions for viewing, recording and simultaneous viewing and recording. For this, three optical elements are provided, namely a completely reflective first element, a partly transparent second element and a compensating element for compensation of the optical distance as the third optical element. The first and second elements are fixed on separate guide carriages which are arranged to be movable relative to one another. Depending on the desired operating position the optical elements are moved into or out of the optical path by pushing them in a straight line along guide rods.

Sliding constructions of this kind are mechanically complex in design, even for a single-channel microscope tube as described in DE 196 22 357 A1 and take up considerable room in stereomicroscopy as each operating position requires two optical elements arranged in pairs, which has an unfavourable effect on the shape and handling of the tube.

WO 99/13370 A1 describes a filter changing wheel for stereo-fluorescence microscopy in which a circular disc is divided into four segments, each segment carrying a number of filters arranged side by side which can be placed in the beam path of the stereomicroscope. For example, one segment might contain three filters, two of which may be placed in the viewing path while one can be placed in the illumination path. The filter carriers which carry the filters form a segment of a circle and are interchangeable. The center point of the changing wheel in this design is located far outside the center of the stereo channels, which means that the device takes up considerable space.

Other known changer devices in stereomicroscopy are currently based on sliding mechanisms. These devices are very limited in the number of operating positions (generally two positions) and also take up considerable space.

Changer devices are also known in which four or eight elements are arranged side by side in a circle, the center of rotation of the arrangement being located in the middle between the two stereo channels, i.e. in the center of the stereobase. This does indeed achieve a more compact construction than with the linear changer devices but the number of original operating positions is restricted by the fact that for each operating position two elements have to be arranged in a circle the diameter of which corresponds to the spacing of the stereo channels.

The growing need for digital documentation, for example, by means of beam decoupling and after decoupling of the beam from the microscope for add-on modules makes it necessary to have more flexible changer devices in stereomicroscopes. A large number of different operating positions should be possible while achieving a compact structure for the changer device.

SUMMARY OF THE INVENTION

The changer device according to the invention for optical elements in stereomicroscopes with which a pair of optical elements can be placed in the two stereo channels of a stereomicroscope has optical elements which are arranged side by side along an arc of a circle, more particularly in a circle, and are rotatable about a center, while between the elements of a pair of elements to be associated with and inserted in the two stereo channels there is provided at least one other optical element, and the center of the arrangement is laterally shifted relative to the center of the stereobase of the stereo channels. The changer device is moved in the stereomicroscope by rotation about the center. A stop can restrict the possible rotation to a preferred range.

The arrangement of optical elements according to the invention which is rotatable about a center, this center being laterally displaced away from the middle of the stereobase, makes it possible to accommodate more elements than before in virtually the same space while retaining a compact construction. Whereas hitherto, in circular or arcuate arrangements, twice the number of optical elements were needed for a certain number of operating positions, it is advantageously possible using the changer device according to the invention to combine an optical element with more than one other optical element to form correspondingly more than one pair of elements. Thus, for example, with three optical elements at least two different pairs of elements can be formed, i.e. at least two different operating positions, which would previously have required four or more elements.

In this arrangement the optical elements can be mounted in space-saving manner close to the middle of the stereobase which connects the stereo channels. Using optical elements located on an arc of a circle it is possible to achieve different operating positions, where, in the arrangement according to the invention, at least one inactive element is arranged between the pair of active elements for each operating position. The elements of the pair of active elements are at a spacing from each other which corresponds to the spacing between the stereo channels. With a given spacing between the stereo channels (=width of the stereobase) the space taken up by the arrangement according to the invention is less than if the two pairs of elements are arranged side by side in an arc, as the center of the arc is closer to the middle of the stereobase (center of the stereo channels).

According to the invention the center of the arrangement, which might be circular for example, is laterally shifted away from the middle of the stereobase (center of the stereo channels) relative to prior art changer devices. This makes it possible in particular to have an odd number of equidistant optical elements arranged in a circle. For example, if there are five optical elements arranged in a circle, a maximum of five different pairs of elements or operating positions can be formed, where on one side of the circle one other optical element is provided between each pair of elements and two other optical elements are arranged on the opposite side. In an arrangement of this kind the center of the arrangement may be located close to the middle of the stereobase so that a compact design can be achieved.

The changer device according to the invention for optical elements in stereomicroscopes with which a pair of optical elements can be placed in the two stereo channels of a stereomicroscope can alternatively be characterised in that the optical elements are arranged side by side on an arc of a circle, more particularly in a circle, while at least one optical element in each case can be combined with another optical element of the changer device to form more than one pair of elements for insertion in the two stereo channels. In this way, using the changer device in a stereomicroscope, two or more operating positions can be formed in which one element is combined with two or more other elements to form different pairs of elements. An arrangement of this kind is extremely flexible and makes it possible to achieve a certain number of operating positions with fewer elements than before.

The optical elements in the changer device according to the invention can be selected from a group comprising filters such as colour and grey filters, shutters, lenses (Bertrand lenses), beam splitters, mirrors and blanks as well as other elements which are optically fully or partially transparent or opaque. Fully transparent elements are transparent compensating elements (e.g. made of glass) which are intended to compensate differences in the optical paths, or blanks (without any optical effect). Opaque elements may be mirrors which deflect the light beam out of its original direction or opaque elements which absorb the light beam.

BRIEF DESCRIPTION OF THE DRAWING FIGURES

The invention and its advantages will be described by way of example hereinafter with reference to an exemplifying embodiment. This is a special embodiment which is not intended to restrict the scope of the invention.

Figure 1B:
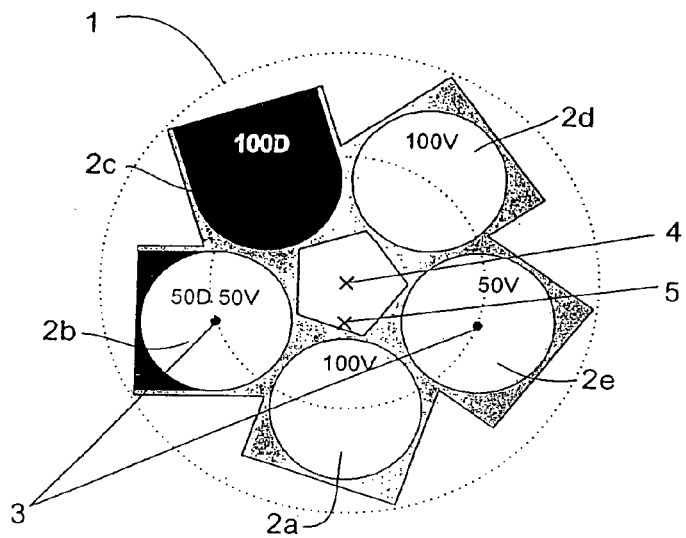
Figure 1C:
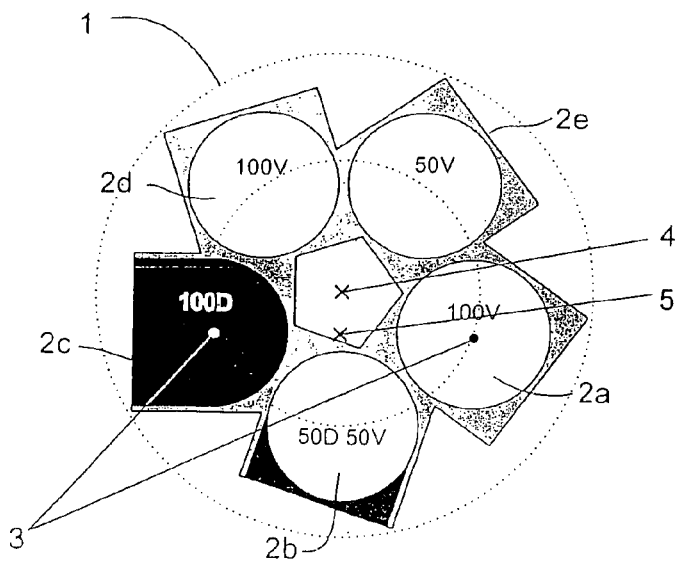
Figure 2:
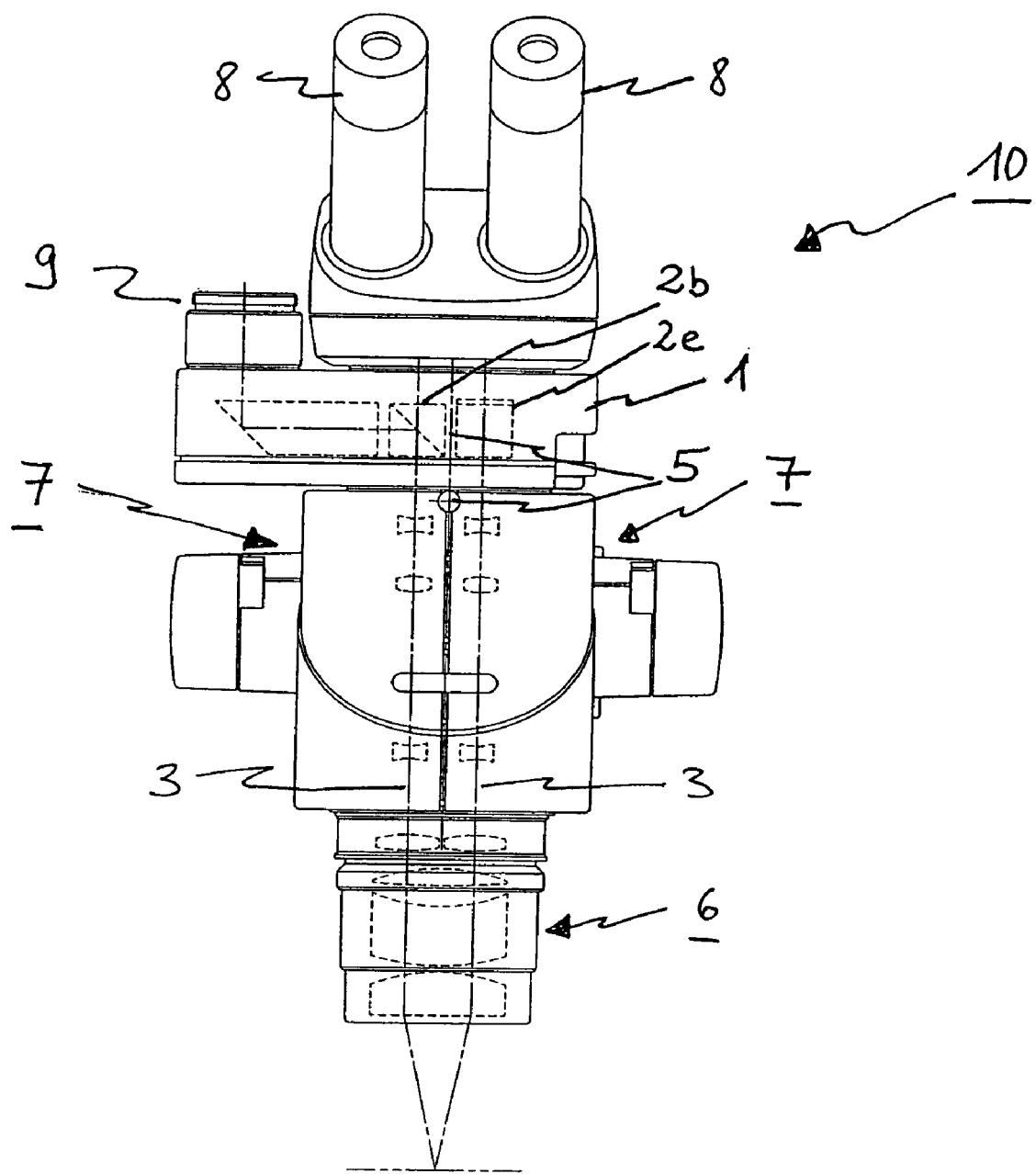

FIGS. 1a through 1c show a changer device according to the invention with five optical elements arranged in a circle, wherein the respective figures show three different operating positions in one stereomicroscope; and FIG. 2 shows a stereomicroscope having a changer device according to the invention as shown for example in FIGS. 1a through 1c.

DETAILED DESCRIPTION OF THE INVENTION

FIGS. 1a through 1c show a changer device 1 according to the invention for optical elements 2 which are arranged in a circle. Using the device shown, three operating positions can be achieved in a stereomicroscope, as shown respectively in FIGS. 1a, 1b and 1c. The three operating positions can be described as "stereo viewing", "50% stereo viewing and 50% documentation" and "100% documentation and single-channel viewing". Elements 2a and 2d are cylindrical glass components (compensators) which serve solely to compensate the optical path length. Element 2b is a beam splitter (splitting ratio: 50/50). Element 2c is a half cube mirror and element 2e is a grey filter with a transmittance of 50%. The center of the annular arrangement 1 is designated 4. The middle of the stereobase or the center of the stereo channels 3 is designated 5.

Because of the odd number of elements 2 and the equidistant annular arrangement, the middle 5 of the stereobase does not coincide with the center 4 of the changer device 1. However, it will be seen that the two points are close together, which results overall in a very compact construction. The stereo channels 3 reproduce the center of the viewing optical paths in a stereomicroscope in the cross-sectional plane which is defined in FIG. 1 by the changer device 1.

In the first operating position, "stereo viewing" (FIG. 1a), the elements 2a and 2d are located in the two stereo channels 3 for viewing with 100% light transmittance. The other elements are located between this pair of elements and constitute inactive optical elements in this operating position.

In the second operating position, "50% stereo viewing and 50% documentation" according to FIG. 1b, the elements 2b and 2e are located in the stereo channels 3. The element 2b is a beam splitter which allows 50% of the light intensity to pass through in the viewing direction and taps or decouples the other 50% for documentation purposes. The optical element 2e is a grey filter with a transmission level of 50% so that viewing with 50% light transmittance can take place in both stereo channels 3.

Switching between the first and second operating positions can be done by rotating by one element in the counter-clockwise direction relative to the position shown in FIG. 1a.

The third operating position "100% documentation and single-channel viewing" is illustrated in FIG. 1c, and this operating position can in turn be achieved by rotating by one element in the counter-clockwise direction out of the position shown in FIG. 1b. In this operating position elements 2c and 2a are located in the optical path of the stereo channels 3. Element 2c is a half cube mirror which deflects the entire optical path and thus makes it available for documentation purposes, for example. The optical element 2a is the cylindrical glass component described above which has 100% light transmittance. The element 2a thus ensures single-channel viewing.

As is clear from this example, using the five elements 2 mentioned it is possible to achieve three operating positions in a stereomicroscope, while the changer device carrying the five elements has a compact construction. This example also shows that in the arrangement 1 according to the invention one element (in this case element 2a) can be used in two different operating positions (FIG. 1a and FIG. 1c) which additionally contributes to a compact construction.

As the optical elements associated with the individual operating positions are not placed in pairs side by side, the center 4 of the arrangement 1 is not far from the middle 5 of the stereobase, and consequently the arrangement can be placed on the lens carrier of the stereomicroscope without taking up too much lateral space.

FIG. 2 shows diagrammatically a stereomicroscope 10 with a changer device 1 as shown in FIG. 1. The objective of the stereomicroscope 10 is designated 6, the zoom systems of the two stereo channels 3 are designated 7. The middle of the stereobase or the center of the stereo channels 3 (or its optical axes) is designated 5. The lenses of the objective 6 and of the two zoom systems 7 are indicated. The eyepieces of the stereomicroscope 10 are designated 8.

As can be seen from FIG. 2, the changer device 1 can be included in a very compact form in a stereomicroscope 10. The operating position of the changer device 1, shown in FIG. 2, corresponds to the second operating position as discussed in connection with FIG. 1b. This operating position, namely "50% stereo viewing and 50% documentation", allows decoupling of 50% of one of the optical paths for documentation purposes. This is achieved by the optical element 2b which represents a beam splitter. The optical element 2e is a grey filter with a transmission level of 50% so that viewing with 50% light transmittance can take place in both stereo channels 3. The resulting image can be viewed through eyepieces 8.

The part of the optical beam deflected from one of the stereo channels 3 is led to a further optical element which directs the beam into a port 9 for documentation purposes. By rotating the changer device by one element in the counter-clockwise direction other operating positions can be achieved as described in connection with FIGS. 1a through 1c.

Starting from the present invention the skilled man can determine the most compact arrangement for each changer device individually depending on the number and type of optical elements needed, their free diameter and the width of the stereobase.

LIST OF REFERENCE NUMERALS

1 Changer device
2, 2a–2e Optical elements
3 Stereo channel
4 Center of the arrangement (1)
5 Middle of the stereobase
6 Objective
7 Zoom system
8 Eyepiece
9 Documentation port
10 Stereomicroscope

What is claimed is:

1. A changer device for optical elements in a stereomicroscope having two stereo channels spaced apart by a stereobase, the changer device comprising:
an axis of rotation; and
a plurality of optical elements arranged along an arc about the axis of rotation such that the changer device is rotatable about the axis to respectively position a pair of optical elements from the plurality of optical elements in the two stereo channels, there being at least one other optical element from the plurality of optical elements arranged along the arc between the pair of optical elements;
wherein the axis of rotation is offset laterally relative to a midpoint of the stereobase; and
wherein at least one optical element from the plurality of optical elements is paired with more than one other optical element from the plurality of optical elements to form different pairs of optical elements for insertion in the two stereo channels.

2. The changer device according to claim 1, wherein the plurality of optical elements includes more than four optical elements.

3. The changer device according to claim 2, wherein the plurality of optical elements consists of exactly five optical elements arranged so that at least three different pairs of elements for at least three different operating positions of the stereomicroscope can be formed using all five optical elements.

4. The changer device according to claim 1, wherein the plurality of optical elements includes optical elements selected from a group consisting of filters, shutters, lenses, beam splitters, mirrors, and blanks.

5. A changer device for optical elements in a stereomicroscope having two stereo channels, the changer device comprising:
an axis of rotation; and
a plurality of optical elements arranged along an arc about the axis of rotation such that the changer device is rotatable about the axis to respectively position a pair of optical elements from the plurality of optical elements in the two stereo channels;
wherein at least one optical element from the plurality of optical elements is paired with more than one other optical element from the plurality of optical elements to form different pairs of optical elements for insertion in the two stereo channels.

6. The changer device according to claim 5, wherein the plurality of optical elements includes more than four optical elements.

7. The changer device according to claim 6, wherein the plurality of optical elements consists of exactly five optical elements arranged so that at least three different pairs of elements for at least three different operating positions of the stereomicroscope can be formed using all five optical elements.

8. The changer device according to claim 5, wherein the plurality of optical elements includes optical elements selected from a group consisting of filters, shutters, lenses, beam splitters, mirrors, and blanks.

9. A stereomicroscope comprising:
two stereo channels spaced apart by a stereobase;
a changer device mounted on the stereomicroscope for rotation about an axis offset laterally relative to a midpoint of the stereobase; and
a plurality of optical elements carried by the changer device and arranged along an arc about the axis of rotation, wherein a pair of the optical elements can be positioned in the stereo channels by rotating the changer device to a corresponding rotational position;
the plurality of optical elements being arranged such that at least one other optical element from the plurality of optical elements is located along the arc between the pair of optical elements positioned in the stereo channels;
wherein at least one optical element from the plurality of optical elements is paired with more than one other optical element from the plurality of optical elements to form different pairs of optical elements for insertion in the two stereo channels.

10. The stereomicroscope according to claim 9, wherein the plurality of optical elements includes more than four optical elements.

11. The stereomicroscope according to claim 10, wherein the plurality of optical elements consists of exactly five optical elements arranged so that at least three different pairs of elements for at least three different operating positions of the stereomicroscope can be formed using all five optical elements.

12. The stereomicroscope according to claim 9, wherein the plurality of optical elements includes optical elements selected from a group consisting of filters, shutters, lenses, beam splitters, mirrors, and blanks.

13. A stereomicroscope comprising:
two stereo channels;
a changer device mounted on the stereomicroscope for rotation about an axis; and
a plurality of optical elements arranged along an arc about the axis of rotation such that the changer device is rotatable about the axis to respectively position a pair of optical elements from the plurality of optical elements in the two stereo channels;

wherein at least one optical element from the plurality of optical elements is paired with more than one other optical element from the plurality of optical elements to form different pairs of optical elements for insertion in the two stereo channels.

14. The stereomicroscope according to claim 13, wherein the plurality of optical elements includes more than four optical elements.

15. The stereomicroscope according to claim 14, wherein the plurality of optical elements consists of exactly five optical elements arranged so that at least three different pairs of elements for at least three different operating positions of the stereomicroscope can be formed using all five optical elements.

16. The stereomicroscope according to claim 13, wherein the plurality of optical elements includes optical elements selected from a group consisting of filters, shutters, lenses, beam splitters, mirrors, and blanks.

* * * * *